United States Patent [19]

Zeppenfeld

[11] Patent Number: 5,093,047

[45] Date of Patent: Mar. 3, 1992

[54] GAS DIFFUSER

[75] Inventor: Reiner Zeppenfeld, Allison Park, Pa.

[73] Assignee: Roediger Pittsburgh, Inc., Allison Park, Pa.

[21] Appl. No.: 654,402

[22] Filed: Feb. 8, 1991

Related U.S. Application Data

[63] Continuation of Ser. No. 465,581, Jan. 18, 1990, abandoned, which is a continuation of Ser. No. 192,543, May 11, 1988, abandoned.

[51] Int. Cl.$^5$ .............................................. B01F 3/04
[52] U.S. Cl. .................................. 261/64.1; 261/122; 137/859
[58] Field of Search ............... 261/64.1, 122; 137/859; 251/61.1

[56] References Cited

U.S. PATENT DOCUMENTS

| | | | |
|---|---|---|---|
| 1,642,051 | 9/1927 | Wall | 261/122 |
| 1,792,286 | 2/1931 | Curry et al. | 261/122 |
| 2,038,451 | 4/1936 | Schatlaneck | 261/122 |
| 2,294,973 | 9/1942 | Ford | 261/122 |
| 2,488,394 | 9/1951 | Ewing et al. | 261/122 |
| 3,048,339 | 8/1962 | Tapleshay | 261/122 |
| 3,083,953 | 4/1963 | Langdon et al. | 261/122 |
| 3,397,714 | 8/1968 | Liljendahl | 137/859 |
| 3,490,479 | 1/1970 | Mott et al. | 251/61.1 |
| 3,490,752 | 1/1970 | Danjes et al. | 261/122 |
| 3,880,965 | 4/1975 | Dudis et al. | 261/122 |
| 3,953,554 | 4/1976 | Loughridge | 261/122 |
| 3,997,634 | 12/1976 | Downs | 261/122 |
| 4,007,240 | 2/1977 | Gosden | 261/122 |
| 4,581,137 | 4/1986 | Edwards et al. | 261/122 |
| 4,629,126 | 12/1986 | Goudy, Jr. et al. | 261/122 |
| 4,631,134 | 12/1986 | Schussler | 261/122 |
| 4,712,583 | 12/1987 | Pelmulder et al. | 137/859 |
| 4,764,314 | 8/1988 | Schneider | 261/122 |
| 4,842,779 | 6/1989 | Jager | 261/122 |
| 4,849,139 | 7/1989 | Jager | 261/122 |

FOREIGN PATENT DOCUMENTS

| | | | |
|---|---|---|---|
| 3316140A1 | 11/1983 | Fed. Rep. of Germany | 261/122 |
| 1037864 | 9/1953 | France | 261/122 |
| 1044737 | 11/1953 | France | 261/122 |
| 712170 | 7/1954 | United Kingdom | 261/122 |
| 824376 | 11/1959 | United Kingdom | 261/122 |

OTHER PUBLICATIONS

Reprint from "Design News" Dec. 1986, Non-Clog Aerator Cuts Wastewater Treatment Costs.
Product brochure of a ROEFLEX Diaphragm Diffurser, Apr. 1986, Roediger, Pittsburgh, Inc. RDD 100/5M.
"IFU" Product brochure.
"GVA" Product brochure.
Dravo Product Bulletin, 72WWT08, Multi-Leaf Spring Diffuser, 1972, 261-122.

*Primary Examiner*—Tim Miles
*Attorney, Agent, or Firm*—Ansel M. Schwartz

[57] ABSTRACT

Gas channeling apparatus and a flexible perforated diaphragm for diffusing gas into a liquid are provided. The gas channeling apparatus includes a ridge which projects from the surface of the gas channeling apparatus that increases the effective area on the diaphragm against which gas presses to increase the force used to expand the diaphragm.

8 Claims, 1 Drawing Sheet

GAS DIFFUSER

This is a continuation of copending application Ser. No. 07/465,581 filed on Jan. 18, 1990, now abandoned, which was a continuation of application Ser. No. 07/192,543, filed May 11, 1988 and now abandoned.

BACKGROUND OF THE INVENTION

1. Field of the Invention

The present invention relates to diffusion and, more specifically, to a device that is used in a system that injects fluid into a liquid.

2. Description of the Prior Art

Gas diffusers are employed in a variety of applications. One important application addresses the aeration of waste water. Water stored in tanks in waste processing plants includes large volumes of sludge, and typically, includes naturally occurring bacteria which injest the sludge to aid in the decomposing of the sludge. The bacteria are aerobic, which means that they require air to remain alive. Therefore, it is desirable to dissolve air into the water to maintain the bacterial population at an appropriate level.

Bacteria begin to die when air is not continually dissolved in the water. The dead bacteria release nitrogen products, such as ammonia, which dissolve in the water. This process is called nitrification. Conversely, bacteria reproduce and increase in population when air is dissolved in the water resulting in a decrease in dissolved nitrogen products. This process is called denitrification.

Some methods of biological waste water treatment employ aeration systems that have the flexibility of intermittent operation to meet fluctuating requirements. Biological systems that require a denitrification stage with preceding or simultaneous nitrification stages occurring in separate tanks can experience considerable process advantages if the tanks can furnish interchangeability for each zone. The speed of nitrification is subject to sharp fluctuations dependent upon the age of the sludge, pH and temperature. During peak winter loads the degree of nitrification will be reduced unless the nitrification zone is increased. Denitrification takes place after ammonia has been converted to nitrate through nitrification. If there is a decrease in the degree of nitrification, it is recommended that the nitrification zone be increased at the expense of the denitrification zone to achieve maximum processing. An aeration system in individual tanks that can be turned off and on adjusts the effectiveness of both zones. The ability to reduce or completely shut down individual sections of or the total aeration system at low flow, primarily at night, enhances operating economy through energy conservation.

One device currently used to aerate water is manufactured and marketed by the assignee of the present invention under the mark "ROEFLEX Diaphragm Diffuser." The ROEFLEX Diaphragm Diffuser is an upwardly facing convex plastic (polymid) dish which functions as a gas channeling device, and is covered by a highly elastic plastic (EPDM) diaphragm. The diaphragm has a multiplicity of perforations designed to furnish maximum oxygen transfer. When air pressure is applied to the dish, the diaphragm lifts and stretches thereby opening the multiple perforations to allow air to pass through the diaphragm in the form of fine bubbles. When the air pressure is shut off, the diaphragm retracts, thereby sealing the perforations against the surface of the dish below the diaphragm. Also, the retraction of the diaphragm seals the opening in the dish where the air is introduced below the diaphragm, since that portion of the diaphragm directly over the gas supply port is nonperforated. The diaphragm is secured to the dish by its own elasticity.

While the ROEFLEX Diaphragm Diffuser is effective to aerate waste water, it requires relatively high air pressure to be functional. The diaphragm is initially raised and stretched by gas, typically issuing from the gas port and pressing against the non-perforated portion of the diaphragm. The force exerted against that portion of the diaphragm is equal to the gas pressure in the gas port multiplied by the cross-sectional area of the port. Since the gas port in the dish has a relatively small cross sectional area, a relatively high air pressure is needed to raise the diaphragm. It is not practical to increase the cross sectional area of the entire gas port since this would increase the volume of air needed to be pumped, considering the large number of diffusers commonly required for proper aeration.

The present invention overcomes the need for increasing the air pressure in the gas port by increasing the effective area over which, the air presses against the diaphragm, with little increase in needed air volume. The preferred embodiment of the present invention provides a cylinder which surrounds the gas port and extends a few millimeters from the surface of the dish. The cylinder is of a larger diameter than the gas port, thereby increasing the surface area on the diaphragm upon which the gas presses to raise the diaphragm from the surface of the dish. However, the height of the cylinder is relatively small, and the gas volume is only sightly increased. Therefore, more force is exerted on the diaphragm due to the increased surface area without substantially increasing the volume of air required. Also an improved seal between the diaphragm and the gas port is provided, which provides more protection against seepage of the waste water into the gas port.

U.S. Pat. No. 1,642,051 discloses an aerator for flotation ore separators. The aerator employs a rubber mat having a plurality of perforations. A tube is positioned below the rubber mat. The tube supplies air below the mat and the air is diffused into the medium above the mat.

U.S. Pat. No. 2,038,451 discloses a device for aerating fermentation liquids, which employs a porous copper plate through which air is diffused into liquid.

U.S. Pat. No. 3,953,554, discloses a diffuser for aeration systems. The diffuser includes a spherical valve which controls the discharge of air from the diffuser. The upper surface of the diffuser also includes a small number of relatively large holes for diffusing air into water.

U.S. Pat. No. 3,997,634 discloses a diffuser assembly. The assembly employs a flexible diaphragm which defines a plurality of holes for discharging air into water. A spherical valve controls the flow of air to the diaphragm.

U.S. Pat. No. 4,007,240 discloses supporting arrangements for porous diffusers, including a porous diffuser which is positioned over a supporting body. The diffuser is clamped to the supporting body by means of a bolt which passes through a hole in the center of the diffuser, and employs a membrane with a gas impermeable center while this patent employs a membrane with a large hole in the center.

U.S. Pat. No. 4,581,137 discloses a gas diffuser tube assembly. The assembly employs an elongated support member around which is positioned a flexible membrane for diffusing air into liquid. The patent discloses, in FIGS. 9 and 10 and column 5, lines 12 through 19, that the openings 26 in the support member may include somewhat conically shaped shoulders 27 which project away from the support and against the surface of the membrane. The shoulders act like a valve seat for the membrane.

U.S. Pat. No. 4,631,134 discloses a process for the intermittent aeration of liquids and aeration devices for use in such a process. This patent discloses an aeration device which includes an elastic, perforated diaphragm with a central opening through which an air port projects.

SUMMARY OF THE INVENTION

The present invention provides a fluid diffuser that includes a fluid chamber defining a fluid intake, a fluid output, and a passage placing the fluid intake and fluid output in fluid communication with each other. Also included is a seal mounted to a fluid channeler that can assume a sealing position in which fluid cannot escape from the fluid output. The seal can be positioned in a diffusing position in which fluid is diffused from the fluid output. The seal and channeler cooperate to form a fluid-tight chamber when the seal is in its sealing position with the fluid tight chamber being in fluid communication with the fluid intake to permit fluid received under pressure from the fluid intake to position the sea in its diffusing position when the fluid pressure in the fluid-tight chamber reaches a predetermined level.

The present invention also provides a diffuser for injecting gas into a liquid that includes gas channeling apparatus for channeling gas from a gas supply to the liquid and flexible perforated diaphragm apparatus in separable contact with the gas channeling apparatus for controlling the gas flow from the gas channeling apparatus to the liquid. The gas channeling apparatus defines a surface against which a portion of the diaphragm apparatus is in separable contact, passageway apparatus through which the gas flows and ridge apparatus projecting from the surface in surrounding relation with the passageway apparatus. The ridge apparatus, the gas channeling apparatus and the diaphragm apparatus define a gas chamber for confining the gas.

BRIEF DESCRIPTION OF THE DRAWINGS

The present invention may be better understood and further advantages and uses thereof will be more readily apparent when considered in view of the following detailed description of the preferred embodiment, taken with the accompanying drawing, in which.

DESCRIPTION OF THE PREFERRED EMBODIMENT

Figure 1:
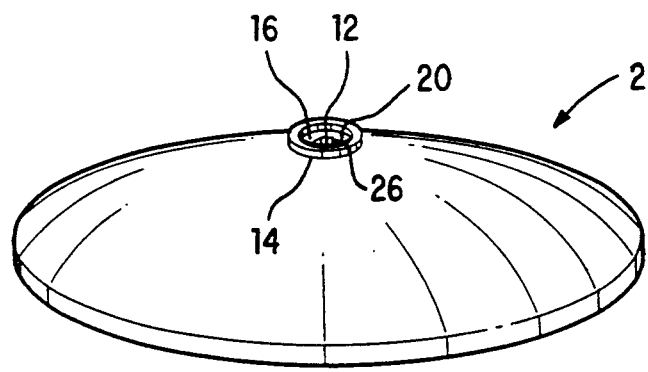
FIG. 1 is a perspective view of the gas channeling apparatus of the present invention.
Figure 2:
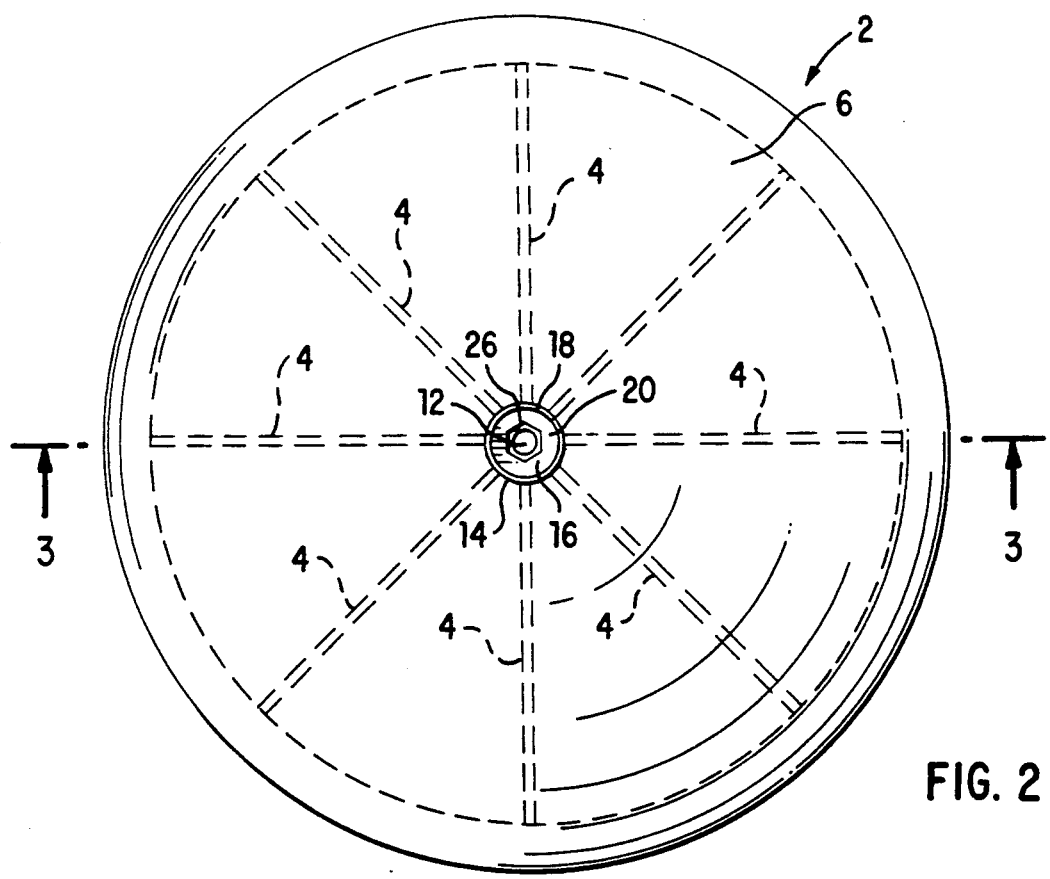
FIG. 2 is a top elevational view of the gas channeling apparatus of FIG. 1.
Figure 3:
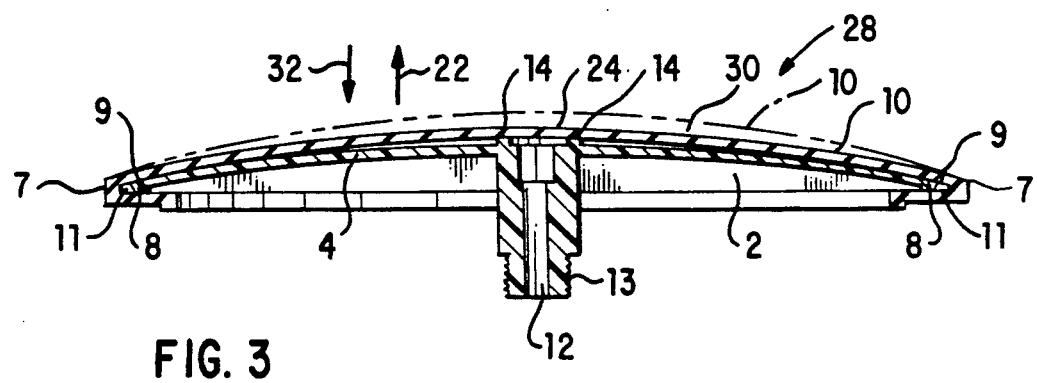
FIG. 3 is a side sectional view of the diaphragm apparatus of the present invention positioned on the gas channeling apparatus of FIG. 1.

FIGS. 1 through 3 show gas channeling device 2. Gas channeling device 2 is, preferably, constructed in one curved, continuous piece of molded polyvinyl chloride or stainless steel. Gas channeling device 2 includes ribs 4 which provide structural support for surface 6. Lip 8 is formed to engage the outer periphery of diaphragm 10. Gas port 12 channels the gas, which is to be diffused into the liquid, from a gas supply (not shown) connected to threaded end 13. Gas port 12 is shown with a hexagonal cross sectional shape, although other shapes would be equally functional.

Gas channeling device 2 also includes ridge 14. Ridge 14 is a generally continuous preferably circular raised portion of gas channeling device 2 which projects from surface 6 and is positioned to completely surround gas port 12 forming, preferably, a right circular cylinder. Since ridge 14 is, preferably, molded into surface 6, gas cannot escape through the junction where ridge 14 and surface 6 meet. Ridge 14 and surface section 16 define a generally cylindrical gas chamber 20 for confining gas. As is shown in FIG. 3, when diaphragm 10 is pressed in contact with edge 18 of ridge 14, gas introduced within gas chamber 20 cannot escape under low gas pressure since diaphragm portion 24, which overlies gas chamber 20, is not perforated.

The diameter of gas chamber 20 is larger than the cross sectional area of gas port 12. Therefore the force exerted on diaphragm portion 24, due to the gas pressure within gas chamber 20, will be greater than would be exerted if diaphragm 10 were in direct contact with end 26 of gas port 12. The significant increase in force is achieved with only a small increase in air volume due to the small volume defined by gas chamber 20.

Diaphragm 10 is, preferably, constructed of an elastic polymer. Edge 7 of diaphragm 10 is formed generally continuously along the entire perimeter of diaphragm 10 to engage upper surface 9 and lower surface 11 of lip 8. Edge 7 removably self secures diaphragm 10 to gas channeling device 2 without the need for additional clamping devices.

The perforations in diaphragm 10 are formed by cutting generally short, linear slits throughout the entire surface of diaphragm 10, with the exception of diaphragm portion 24 which remains uncut. The slits are generally evenly spaced apart so that each square inch of surface area of diaphragm 10, with the exception of diaphragm portion 24, has approximately forty slits.

In use, commonly, each of a plurality of gas channeling devices 2 is fitted with diaphragms 10 to form diffusers 28. Each of the diffusers 28 is, typically, positioned inside and near the bottom of a waste water tank (not shown) with surface 6 of each gas channeling device 2 facing upwardly. Each threaded end 13 of gas channeling device 12 is connected to one or more gas supplies which can provide, preferably, air under pressure, although other gases could be supplied as well. Although any one of a variety of gas supplies may be employed, waste water tanks typically employ centrifugal blowers which supply a generally constant volume of air output per second under constant pressure. The blowers are sized based on the number of diffusers 28 which must be used, since each diffuser 28 requires approximately 6 cubic feet of air per minute to function properly. Four factors determine the level of pressure at which gas must be supplied to gas channeling device 2. They are:

1. The depth at which diffusers 28 are submerged;
2. The distance between the gas supply and the diffusers;
3. The diameter of the supply line between diffusers 28 and the air supply; and 4. Ambient conditions such as water temperature, specific gravity of the waste water, elevation, and the like.

Waste water is introduced into the tank after diffusers 28 and the associated gas supply are installed. Before the gas supply is activated, diaphragm 10 is pressed against surface 16 and edge 18 due to the pressure of the water on diaphragm 10. Since diaphragm portion 24 is not perforated, the only path by which gas may enter or exit gas chamber 20 is through gas port 12. After the gas supply is activated, the gas pressure in gas port 12 begins to increase, causing the gas pressure in gas chamber 20 to increase. When the force exerted against diaphragm portion 24 in the direction of arrow 22 exceeds the sum of the elastic force of diaphragm 10 exerted in the direction of arrow 32 and the force exerted in the direction of arrow 32 on diaphragm 10 by the waste water, diaphragm 10 rises from surface 6 as shown in phantom in FIG. 3.

Gas then enters space 30 between surface 6 and diaphragm 10 generally over the entire area of surface 6. Since diaphragm 10 is now stretched, the perforations in its surface open allowing gas to escape from space 30 into the waste water. Gas will continue to escape through the perforations in diaphragm 10 as long as sufficient gas pressure is maintained in the direction of arrow 22 against diaphragm 10. No water will leak through the perforations into space 30 since the gas pressure within space 30 is greater than the water pressure against diaphragm 10. The water pressure on the surface of diaphragm 10 will cause diaphragm 10 to return to its original position in contact with surface 6 and edge 18 when the gas pressure within space 30 is decreased sufficiently. This loss of gas pressure stops the diffusion of air into the waste water. Edge 18 is in tight contact with diaphragm portion 24 since ridge 14 projects from surface 6 thereby providing an effective seal against water leakage into gas port 12. Therefore, it may be appreciated that diffuser 28 not only provides a more efficient apparatus for raising diaphragm 10 from gas channeling device 2, it also provides a tight seal that prevents waste water from entering gas port 12.

Whereas particular embodiments of the invention have been described above for purpose of illustration, it will be evident to those skilled in the art that numerous variations of the details may be made without departing from the invention as defined by the appended claims.

What is claimed is:

1. A diffuser for injecting gas into a liquid comprising:
    a gas channeler having a single gas port for channeling gas to be diffused into the liquid, a gas impermeable surface which extends radially outward from the gas port having a lip defining the surface's outer periphery and a ridge surrounding the gas port forming a high cylinder thereabout such that gas cannot escape therethrough and a single gas chamber is defined thereby, there being only one gas chamber in the diffuser;
    a flexible diaphragm covering the surface and in separable contact therewith for controlling the gas flow from said gas channeler to the liquid, said diaphragm sealingly but removably fitted about the surface's lip thereto, said diaphragm having a first portion which is nonperforated and a second portion which is perforated and surrounding the first portion, said gas passes through said diaphragm by way of said perforations, said first portion of the diaphragm disposed over the ridge of the surface and sealing the gas chamber when said diaphragm contracts said ridge such that less pressure from a given amount of gas flowing through the gas port lifts the diaphragm from the chamber than otherwise is needed if the ridge was not present.

2. A diffuser as described in claim 1 wherein the diaphragm in separable contact with the channeler has essentially a mushroom shape.

3. The apparatus of claim 1 wherein said diaphragm defines a plurality of perforations.

4. The apparatus of claim 3 wherein the portion of said diaphragm adjacent said ridge is gas impermeable.

5. The apparatus of claim 4 wherein said diaphragm includes means for removably attaching said diaphragm to said gas channeler.

6. The apparatus of claim 5 wherein said surface of said gas channeler is curved.

7. The apparatus of claim 5 wherein said gas channeler is constructed from polyvinyl chloride.

8. The apparatus of claim 5 wherein said gas channeler is constructed from stainless steel.

* * * * *

UNITED STATES PATENT AND TRADEMARK OFFICE
CERTIFICATE OF CORRECTION

PATENT NO. : 5,093,047
DATED : March 3, 1992
INVENTOR(S) : Reiner Zeppenfeld

It is certified that error appears in the above—identified patent and that said Letters Patent is hereby corrected as shown below:

Column 1, line 19, delete "injest" and replace with -- ingest -- .

Column 3, line 31, delete "sea" and replace with -- seal -- .

Column 4, line 9, after "continuous" insert -- and -- .

Column 6, line 26, delete "contracts" and replace with -- contacts -- ;

Column 6, line 36, after "adjacent" insert -- to -- .

Signed and Sealed this

Fifteenth Day of June, 1993

Attest:

MICHAEL K. KIRK

*Attesting Officer*     *Acting Commissioner of Patents and Trademarks*